United States Patent Office 3,515,197
Patented June 2, 1970

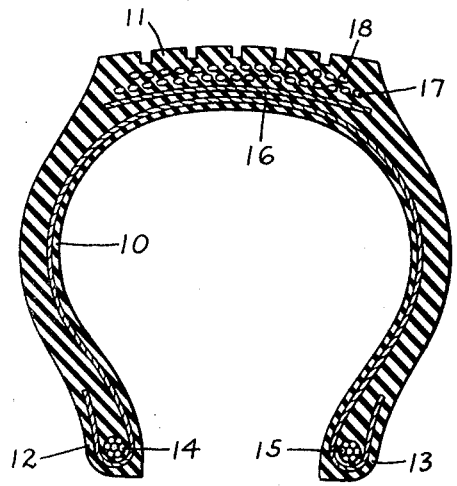
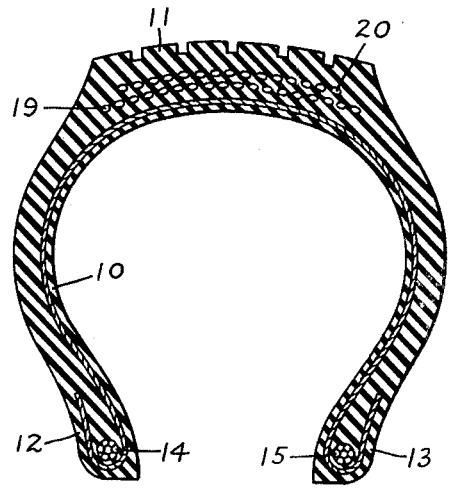
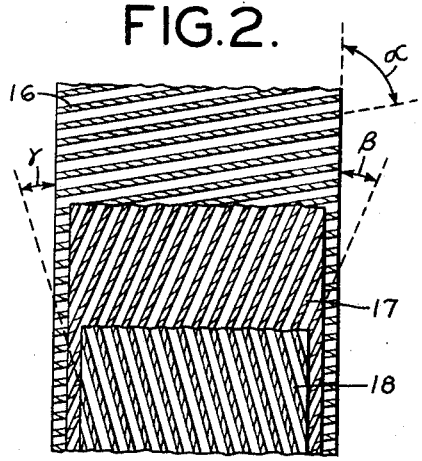
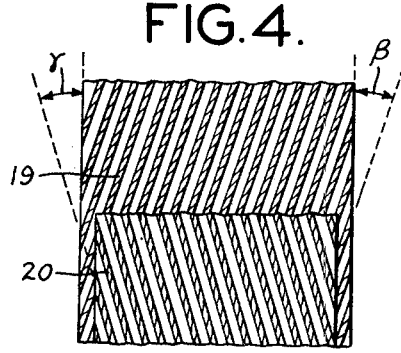
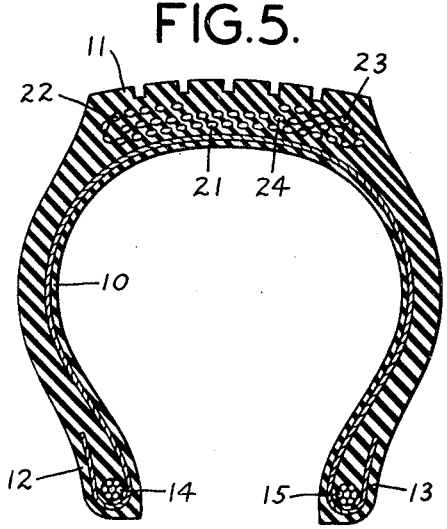
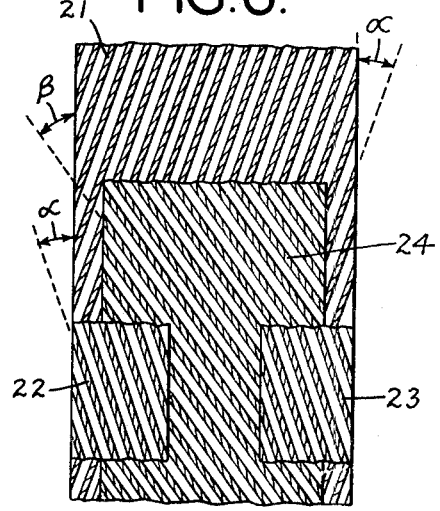

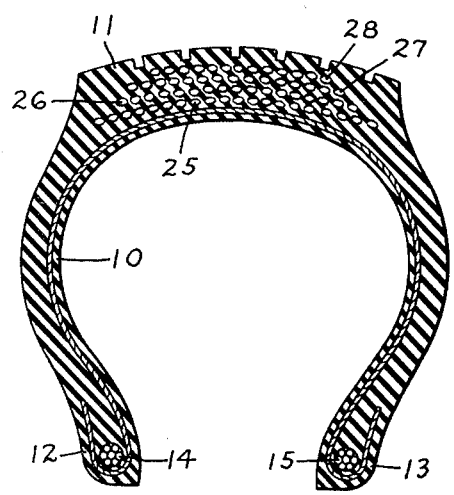
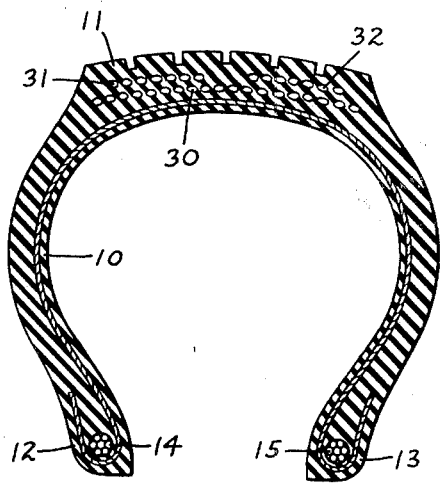
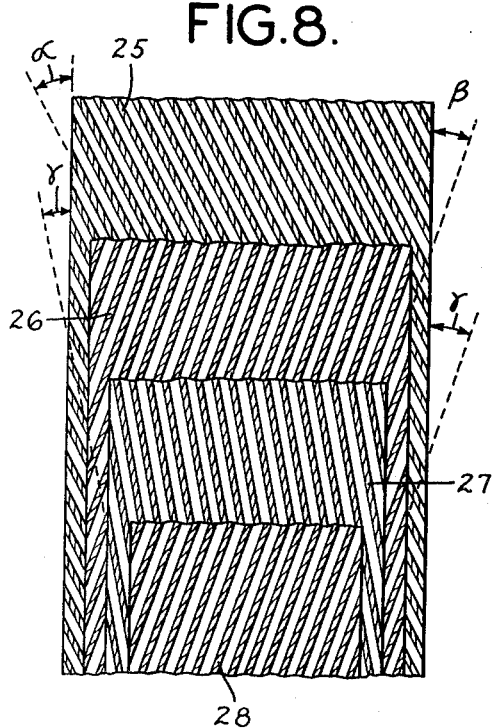
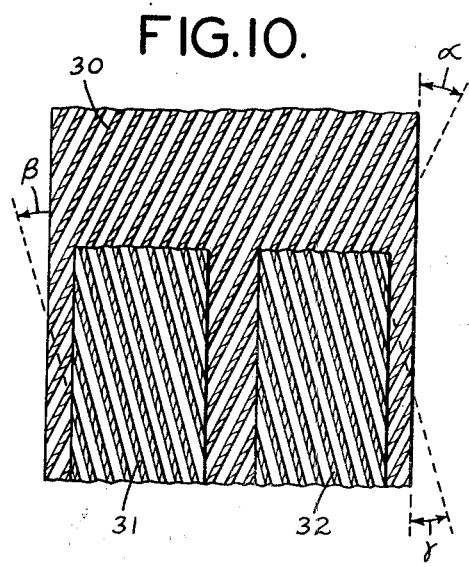

3,515,197
PNEUMATIC TIRES
Jacques Boileau, Clermont-Ferrand, France, assignor to Compagnie Generale des Etablissements Michelin, raison sociale Michelin & Cie, Clermont-Ferrand, Puy-de-Dome, France
Filed Nov. 30, 1966, Ser. No. 598,028
Claims priority, application France, Dec. 1, 1965, 40,540
Int. Cl. B60c 9/20
U.S. Cl. 152—361         3 Claims

ABSTRACT OF THE DISCLOSURE

A plurality of pneumatic tires in which certain tires, designed for use on the rear axle, have a higher deviation coefficient than those tires designed for use on the front axle. The difference in deviation coefficient is a result of changing certain variables in the tire structure, as for example, cord angle, elasticity and tread groove angularity.

---

The present invention relates to improvements in pneumatic tires and, more specifically, to tires for fast and high-powered cars, such as racing and sports cars.

It is known that, in order to improve the stability of automotive vehicles and, in some instances, to reduce a tendency to oversteer, the drift (deviation) of the tires mounted on the rear wheels should be less than the drift of the tires mounted on the front wheels. In general, this result is attained by mounting the same tires in front and in back and inflating the rear tires to a higher pressure than the front tires. However, this is possible only with vehicles having comparatively moderate power and speed and in which the rear axle is not loaded substantially heavier than the front axle. The difference in inflation pressure between the front and rear tires must be increased to compensate for the heavier load carried by the rear tires. In certain cases where the front-rear load ratio is unfavorable, it is necessary to under-inflate the front tires and over-inflate the rear tires to improve the drift or deviation characteristics of the vehicle. Disadvantages arise under these conditions, namely, rapid wear and tear of the tires, an uncomfortable ride by reason of over-inflation of the rear tires, and loss of road-holding of the rear wheels on rough ground resulting from bouncing of the over-inflated tires.

In order to make use of the full power of the engine and avoid spinning of the driving wheels of high-speed and high-powered cars, the rear axle may be loaded and the front axle lightened by placing the motor in the rear or in a center-rear position. Under these circumstances, the use of different inflation pressures in the front and rear tires is not sufficient to give completely satisfactory drift characteristics to the front and rear tires and to correct the very pronounced oversteering of such cars. In practice, not only are different inflation pressures used in the tires but tires of different dimensions are provided for the front and rear of the vehicles; e.g., tires with wider treads are mounted on the rear wheels. Thus, for example, high-speed racing, sports and "drag" cars may be equipped with tires measuring 5.50 x 15 in front and tires measuring 6.00 x 15, 6.50 x 15, or 7.00 x 15, 7.25 x 15 or even larger in the rear.

While different size tires and different inflation pressures at the front and rear of the vehicle afford some improvement in drift or deviation characteristics, they do not solve the problem of wheel bounce and the loss of the road-holding ability of the rear wheels on even ground, or the problem of discomfort or that of rapid wear and tear of the tires. Moreover, other disadvantages arise. For example, more space is required to house the larger tires in the rear of the vehicle; heavy tires and wheels corresponding to them are more expensive; aerodynamic drag and the tendency to skid on wet ground at great speed increase as the width of the tread increases; and, finally, unless two spare tires are provided, trouble can arise in case of a flat tire or damage may result from using two tires with idfferent rolling circumferences on the same axle.

This invention remedies the above-mentioned disadvantages and, even on high-powered and high-speed cars, enables the use of tires of the same size in front and in the rear, and to do so with similar tire pressures and deflections.

Tires in accordance with the invention are of the radial carcass type, with a treat reinforced by a crown reinforcement, and are characterized in that, in spite of identical dimensions for mounting in front and in the rear of a vehicle, they have a deviation or drift coefficient, i.e., resistance to drifting, which for the rear tires is higher than the deviation coefficient for the front tires, at equal load and pressure, and colse-to-normal values for use, so that a ratio of the deviation coefficient to the load carried by the tire is attained which is larger in the rear tires than in the front tires, the deflection of the tires being substantially the same. In practice, the deviation coefficient of the rear tires should be at least about 1.2 times the deviation coefficient of the fornt tires, these coefficients being measured at a load and pressure which are equal and close to the normal working values. Under these conditions and for a customary distribution of the load of the vehicle between the front and rear axles, a deviation of the rear wheels can be obtained which is less than the deviation of the front wheels (ratio of the deviation coefficient to the load greater for the rear tires than for the front tires) and, on the other hand, the deflections of the front and rear tires can be substantially equalized by suitably selecting the inflation pressures as a function of the loads, without overloading, over-inflating or under-inflating. Thus, the front and rear tires operate under substantially identical and normal conditions from the point of view of carcass fatigue, wear and tear of the tread travelling in a straight line and in vertical flexibility and may, therefore, be used under conditions close to the optimum. Furthermore, the fact that the rear tires are not over-inflated improves the comfort and, above all, the road-holding ability of the rear wheels while preventing skidding on bumpy, uneven ground, in curves and during accelerating or on braking. Inasmuch as the front tires are not under-inflated, wear is markedly reduced. Moreover, the disadvantages connected with having tires of different dimensions in the front and in the rear disappear, and when radial carcass tires are used it is possible to choose for the four wheels the smaller of the two tire sizes used heretofore.

As used herein, deviation coefficient D of a tire at a given load and pressure corresponds to the ratio $F/\delta$ wherein F is a lateral force to which the tire is subjected and $\delta$ the angle of deviation which results from application of the lateral force F. There is a linear relation or proportionality between F and $\delta$ if $\delta$ is small, for example below or equal to 3°. In general, one measures D by choosing F in a manner whereby $\delta$ becomes 2° or close to it. The deviation coefficient D may be expressed in various units. In this text, the deviation coefficients are expressed in deca-Newtons by degree of deviation which is indicated by the abbrevation "dan°."

In order to vary the deviation coefficient and to obtain tires having the same size by having deviation coefficients which are both high and substantially different at the same time, the tires may involve in their construction one or more of the factors listed below, with the understanding that the tires have a radial carcass and a peak reinforcement. The most effective factors are as follows:

angles of the cords of the peak ply,
modulus of elasticity of the calendering rubber of the peak plies,
modulus of elasticity of the cords constituting the peak plies,
modulus of elasticity of the rubber constituting the tread,
width of the peak plies,
number of peak plies,
direction of the grooves and lugs or ribs of the tread.

The following examples show the manner in which each of the factors acts. Although each of the examples explains the action of a single factor, two or more factors may be included in the tires in order to establish a difference of the deviation coefficient of one tire which is at least 20% of the value of the lowest deviation coefficient of another tire.

In view of the fact that a deviation (drift) of the vehicle is accompanied by a lateral shifting of the load, the differentiation of the front tires and the rear tires may also be obtained by giving them an asymmetrical structure with respect to the median plane and by using identical tires in front and in back, which, however, are positioned differently, with the sidewall placed on the outside in the rear corresponding to the sidewall placed on the inside in front.

An asymmetric tire does not have the same deviation coefficient, depending on whether the deviation occurs on one or the other side of the median plane or whether the lateral force which produces the deviation acts in one or the other direction in relation to the median plane. With asymmetrical tires, the rear tires should be mounted on the wheel in such a manner that the deviation coefficient is the highest opposing a lateral thrust applied to the vehicle and a lateral effort exerted by the tire on the ground, both directed transversely from the center of the vehicle toward the outside. In contrast thereto, the front tires can be positioned so that the deviation coefficient attains its lowest value opposing thrusts in the same direction as exerted on the rear tires. Thus, in a turn, under the effect of the centrifugal force, the rear tires will offer the greatest resistance to deviation and have the lowest deviation or drift.

This manner of placing asymmetric tires may of course be applied to advantage in accordance with the invention even to ordinary automotive vehicles as contrasted with sports or racing cars and regardless of the degree of asymmetry.

The different deviation coefficients of the two sides of an asymmetric tire, depending on the direction of the transverse force, may be obtained, generally speaking, by the same means as are used to produce different deviation coefficients in two tires of the same measurements. Accordingly, an asymmetric tire can be viewed as being formed of two half-tires of the same dimensions but of different structures, thereby showing that the two types of differentiation are basically the same.

The present invention will be fully understood by reference to the following examples, which show how different factors affect deviation coefficients of tires, and to the accompanying drawings, in which:

FIG. 1 is a view in radial cross-section through a tire embodying the present invention;

FIG. 2 is a view in section showing an arrangement of the crown plies thereof;

FIG. 3 is a view in radial cross-section of a modified form of tire embodying the invention;

FIG. 4 is a view in section showing the arrangement of the crown plies thereof;

FIG. 5 is a view in radial section through another form of tire embodying the invention;

FIG. 6 is a view in section showing the crown plies thereof;

FIG. 7 is a view in radial cross-section through another form of tire embodying the invention;

FIG. 8 is a view in section showing the arrangement of the crown plies thereof;

FIG. 9 is a view in radial cross-section through still another form of tire embodying the present invention;

FIG. 10 is a view in section showing the arrangement of the crown plies thereof.

Figure 11A:
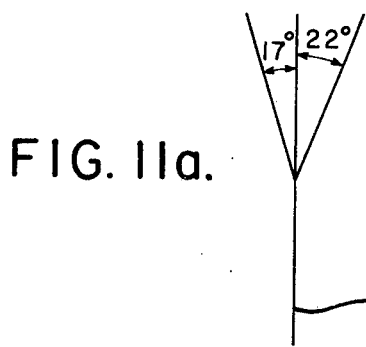
FIGS. 11a–11d are schematic representations of comparative angles, widths, directions and areas according to the invention.

All of the tires illustrated in the drawings include a radial carcass 10 made of cords or cables of metallic, synthetic or natural fibers or filaments, a tread 11, beads 12 and 13, and bead cables or wires 14 and 15. The walls, tread and beads are composed of a suitable elastomer such as natural and/or synthetic rubber compounds. In the tire shown in FIGS. 1 and 2, a crown reinforcement of plies 16, 17 and 18 of cords or cables is interposed on the tread outwardly of the carcass.

EXAMPLE 1

Influence of the crown ply angles (a) Typical tires of the type shown in FIGS. 1 and 2 have the following characteristics:

Dimension: 165 x 380
Wheel: 4½J x 15
Load: 400 kg.
Pressure: 1.8 bars

The plies 16 to 18 consist of steel cords formed by combining ten wires of 0.18 mm. diameter in two layers (a core of two wires, a cover of eight wires). These cords are calendered in rubber having a modulus of elasticity of 390 decibars (dbars) at 100% elongation. Two tires I and II were made having the following differences:

| | Tire I | Tire II |
|---|---|---|
| Angle $\alpha$ of peak ply 16 | 80° to the right | 80° to the right. |
| Angle $\beta$ of peak ply 17 | 22° to the right | 30° to the right. |
| Angle $\gamma$ of peak ply 18 | 17° to the left | 24° to the left. |

See also FIG. 11a. Under the same operating conditions of load, lateral thrust and deviation or drift, the tires had the following deviation coefficients:

Deviation coefficient in dan °:
    Tire I _____ 80
    Tire II _____ 66

The deviation coefficient varies in the opposite direction to the angle of the working plies 17 and 18. The deviation coefficient of tire I is approximately 20% higher than that of tire II which has a high value.

(b) Tires of the type shown in FIGS. 3 and 4 have two crown plies 19 and 20 and may have, by way of example, the following characteristics:

Dimensions: 135 x 380
Wheel: 4J.15
Load: 200 kg.
Pressure: 1.6 bar

The plies 19 and 20 are composed of steel cables of the kind described above and are embedded in calendering rubber having a modulus of 875 dbars at 100% elongation.

Tires III and IV were made corresponding to the tires of FIGS. 3 and 4 with the following arrangement of plies:

| | Tire III | Tire IV |
|---|---|---|
| Angle of peak ply 19$\beta$ | 18° to the right | 30° to the right. |
| Angle of peak ply 20$\gamma$ | 18° to the left | 26° to the left. |

The tires III and IV had a deviation coefficient in dan ° of:

Tire III _____ 60
Tire IV _____ 41

In this case, too, the deviation coefficient varies in the opposite direction to the angle of the crown plies.

EXAMPLE 2

Influence of the modulus of the calendering rubber

Tires V and VI of the type shown in FIGS. 3 and 4 were made having the following common characteristics:

Dimension: 165 x 380
Wheel: 4½J–15
Load: 400 kg.
Pressure: 1.8 bars
Crown ply angles: 26° right and 26° left The plies are of steel cords with four wires of 0.23 mm., calendered in different rubbers.
The differences are as follows:

|  | Tire V | Tire VI |
|---|---|---|
| Modulus of the calendering rubber (in dbars at 100% elongation) | 390 | 875 |
| Deviation coefficient (dan°) | 62 | 79 |

The deviation coefficient increases with an increase of the modulus of the calendering rubber. The difference between the deviation coefficients is in excess of 20%.

EXAMPLE 3

Influence of the modulus of elasticity of the cords of the crown reinforcement (a) Tires of the type shown in FIGS. 5 and 6 include a wide inner crown ply 21 having its edges 22 and 23 folded over a narrower outer ply 24 and, for example, have the following common characteristics:

Dimension: 180 x 380
Wheel: 5J–15
Load: 400 kg.
Pressure: 2.0 bars
Angle of the crown ply 21α: 19° right
Angle of the crown ply 22β: 38° left
Modulus at 100% of the calendering rubber: 390 dbars Tires VII and VIII of the kind shown in FIG. 5 and 6 were made, these tires having the following differences:

|  | Tire VII | Tire VIII |
|---|---|---|
| Crown ply 21:cords | Steel 3 (1+6) 0.12 mm. | Nylon 2 x 2 x 1,680. |
| Crown ply 22:cords | Steel 3 (1+6) 0.15 mm. | Steel (2+8)0.18 mm. |
| Deviation coefficient in dan°. | 119 | 84.5. |

The formula for the cords states the number of strands, the number of successive layers (for example 1+6 or 2+8) in each strand and, finally, the diameter of the wire in mm. or, in the case of nylon, the denier.

The steel cord thus provides a deviation coefficient which is definitely higher than that provided by a combination of steel plus nylon which, however, also provides a very high deviation coefficient.

(b) The same conclusion may be drawn from the comparison of tires of the type having stacked plies, i.e., of the type shown in FIGS. 1, 3 or 7. The tire shown in FIGS. 7 and 8 has four crown plies 25, 26, 27 and 28.

Tires IX and X were made and are, respectively, the kind shown in FIGS. 1 and 2, and 7 and 8. These tires had the following common characteristics:

Size: 165 x 380
Wheel: 4½J 15
Load: 400 kg.
Pressure: 1.6 bars

Tire IX differed from tire X as follows:

|  | Tire IX | Tire X |
|---|---|---|
| Number of peak plies | 3 | 4. |
| Type of cords | Steel (2+8) 0.18 | Nylon 2 x 840. |
| Plies | 16, 17, 18 | 25, 26, 27, 28. |
| Angles | 80° R, 28° R, 18° L | 30° L, 15° R, 10°L, 10° R. |
| Calendering:modulus at 100% elongation (in dbars). | 390 | 875. |
| Deviation coefficient (dan°). | 80 | 60. |

In this case, there are four differences of structure, three of which favor tire X from the point of view of the deviation coefficient (number of plies, angles, calendering); the fourth (modulus of the steel cord) favors tire IX and imparts to tire IX a deviation coefficient which is one-third higher than that of tire X.

EXAMPLE 4

Influence of the modulus of the tread

Tires XI and XII of the type shown in FIG. 1, were made with the following common characteristics:

Size: 165 x 380
Wheel: 4½J 15
Load: 400 kg.
Pressure: 1.6 bars
Crown ply: of identical steel cords calendered in the same rubber Tires XI and XII differ in the nature of the rubber of the tread:

|  | Tire XI | Tire XII |
|---|---|---|
| Tread | Natural rubber | Synthetic rubber (SBR) |
| Modulus at 100% (dbars) | 135 | 145. |
| Deviation coefficient (dan°) | 62.5 | 73. |

The two treads differ not only in the nature of the rubber and the static modulus of the mixture but also are different in the dynamic modulus, the hysteretic loss at all frequencies being higher for the synthetic rubber than for the mixture of natural rubber.

EXAMPLE 5

Influence of the width of the crown plies

Figure 11B:
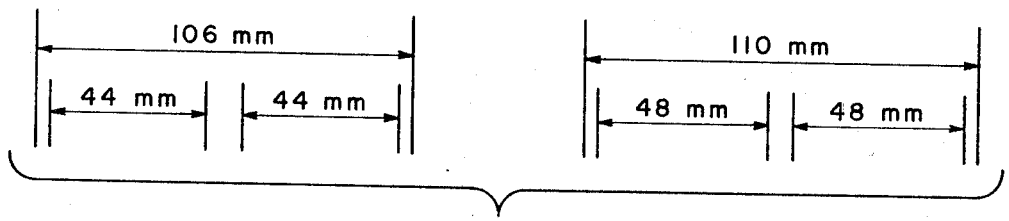

Tires XIII and XIV of the type shown in FIGS. 9 and 10 including a wide inner crown ply 30 and two narrow outer plies 31 and 32 have the folowing common characteristics:

Size: 145 x 14
Wheel: 4J–14
Load: 300 kg.
Pressure: 1.8 bars
Crown ply 30 22° right ⎫ of identical steel
Crown ply 31 17° left  ⎬ cords calendered in
Crown ply 32 25° left  ⎭ the same rubber Tires XIII and XIV have the following differences (see also FIG. 11b).

|  | Tire XIII | Tire XIV |
|---|---|---|
| Width of ply 30 in mm | 106 | 110 |
| Width of plies 31 and 32 in mm | 44 | 48 |
| Deviation coefficient (dan°) | 46.5 | 52 |

The deviation coefficients were measured for a transverse thrust exerted by the tire on the ground directed as follows: from the center or median plane of the tire toward the side containing ply 32.

An increase of the width of the plies of less than 10% results in an appreciable increase of the deviation coefficient, e.g. in excess of 10%.

EXAMPLE 6

Influence of the number of crown plies

Tires XV and XVI, respectively, of the types shown in FIGS. 1 and 3 were made with the following common properties:

Size: 165 x 400
Wheel: 165 x 400
Load: 400 kg.
Pressure: 1.6 bars
Cords: steel (2+7) 0.18
Calendering (modulus at 100% elongation): 390 dbars The tires had the following differences:

|  | Tire XV | Tire XVI |
|---|---|---|
| Successive crown plies, width in mm. and agle | 118 mm. 80° right. 106 mm. 28° right. 128 mm. 18° left. | 106 mm. 28° right. 128 mm. 18° left. |
| Deviation coefficient (dan°). | 78. | 65. |

In the example under consideration, the addition of one supplementary ply increases the deviation coefficient by 20%.

EXAMPLE 7

Influence of the direction of the tread grooves

Tires XVII and XVIII with identical structures and of the type represented in FIG. 1, of 165 x 380 size, load 400 kg., inflated to 1.6 bar, were provided with different tread patterns.

Tire XVII had a tread provided with longitudinal grooves of 5 mm. width, 7.5 mm. depth, and spaced apart 17.5 mm.

Figure 11C:
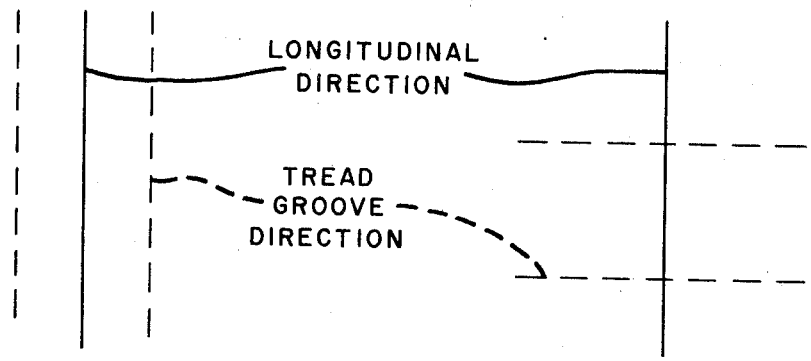

Tire XVIII had a tread containing transverse grooves of the same dimensions, spaced apart 12.5 mm. See also FIG. 11c.

The deviation coefficients are, respectively, 92 and 102.5 dan°. Thus, a tread groove pattern enhancing transverse flexibility results in a decrease of the deviation coefficient.

EXAMPLE 8

Influence of asymmetry of angles

A tire XIX of the type shown in FIGS. 9 and 10 of 165 x 400 size, load 400 kg., and inflated to 1.8 bars, was provided, with crown plies of identical steel cords embedded in the same calendering rubber. The first crown ply had a width of 128 mm. and its direction was 22° to the right; the two other plies had a width of 55 mm. and one of them was directed at 17° to the left, the other one at 25° to the left. The tread was composed of a single elastomer mixture and it had symmetrically arranged grooves therein.

The deviation coefficient was 80 or 95 dan°, depending on whether the lateral effort exerted by the tire on the ground is directed from the center of the tire in the direction of the half-ply at 25° or the half-ply at 17°.

EXAMPLE 9

Influence of asymmetry of the molding

Figure 11D:

A tire XX of 180 x 380 size, a load of 500 kg. and inflation of 1.8 bar, of the type shown in FIGS. 9 and 10, was reinforced with identical steel cords in all plies and calendered in the same rubber. The first crown ply 30 was 134 mm. in width and was directed at an angle of 22° toward the right. The two other plies 31 and 32 had a width of 59 mm. and were directed at angle of 17° toward the left. Thus, the reinforcement is symmetrical. The asymmetry is provided by the pattern of the tread which had a greater groove area on one side than the other. See also FIG. 11d. Depending on whether the lateral effort exerted by the tire on the ground is directed from the center of the tread toward the edge which has lesser groove area or toward the edge which has a greater groove area, the deviation coefficient is 78.5 or 74 dan°. This difference would be stressed with the grooves extending in a predominantly longitudinal direction on one side and a predominantly transverse direction on the other side. It could also be more pronounced if an asymmetry of the internal structure were added to the asymmetry in form or direction of the pattern.

EXAMPLE 10

Influence of asymmetry of the materials forming the tread

A tire XXI of the type shown in FIGS. 1 and 2 with a size of 165 x 380, a load of 400 kg., and an inflation pressure of 2.0 bars, has a symmetrical internal structure but a tread which consists of different mixtures and rubbers on each side of the median plane. On one side a natural rubber mixture was used and on the other side a synthetic rubber mixture was used as described in Example 4, above. The deviation coefficient is 62 or 68 dan°, depending on whether the lateral effort exerted by the tire on the ground is directed from the center of the tread toward the side with the natural rubber or toward the side with the synthetic rubber.

Other variations and combinations of the above factors are possible, and it is clear that the deviation coefficients of tires of the same dimensions and asymmetric tires can be varied widely without affecting the inflation pressure and at the same time obtaining a high deviation coefficient for the tire or the side of the tire least resistant to drift. In particular, steel cords, employed by themselves or in combination with other materials, enable marked variations to be produced while at the same time remaining within the zone of high deviation coefficients.

The following specific example illustrates how the most favorable conditions of use may be attained by means of tires in accordance with the invention.

The conditions of the test involved a car having a load of 350 kg. per wheel in front and 450 kg. per wheel in the rear, i.e., a load ratio AR/AV (BACK/FRONT) of 1.3, which is common for a fast car.

Tires VIIa and VIIIa selected for the test were 185 x 380 size tires, similar to tires VII and VIII above and disclosed in FIGS. 5 and 6, the crown ply angles of which have been modified, however.

|  | Tire VIIa | Tire VIIIa |
|---|---|---|
| Crown ply 21 | 20° right | 17° right. |
| Crown ply 24 | 34° left | 37° left. |
| Deviation coefficient in dan° at 400 kg. and 2.0 bars. | 106 | 85.5. |

With the tire VIIIa under a load of 350 kg., the following characteristics are obtained:

| Pressure in bars | 1.5 | 2.0 | 2.5 | 3.0 |
|---|---|---|---|---|
| Deflection in mm | 26.2 | 22.0 | 29.0 | 16.4 |
| D/350 | 0.217 | 0.233 | 0.238 | 0.234 |

With the tire VIIa under a load of 450 kg., the following characteristics are obtained:

| Pressure in bars | 1.5 | 2.0 | 2.5 | 3.0 |
|---|---|---|---|---|
| Deflection in mm | 30.5 | 24.8 | 21.0 | 18.0 |
| D/450 | 0.223 | 0.242 | 0.253 | 0.249 |

By choosing a difference in pressure of approximately 0.4 bar between front and rear, the deflections are similar; for example, by selecting a pressure of 1.6 bars in front and 2.0 in back, a deflection is produced, in both cases, close to 25 mm. On the other hand, the ratio of the deviation coefficient ratio to the load is clearly higher for the rear tires than the ratio for the front tires.

By way of comparison, identical commercial radial tires with a textile fiber crown reinforcement will require an inflation of 1.8 bars in front and 3.0 bars in the rear in order to furnish the same value for the ratio of the deviation coefficient to the load carried, and a deflection difference of 15%.

From the preceding description of typical embodiments of the invention, it will be apparent that various combinations of ply arrangements, ply cords and rubber compositions, tread patterns and tread compositions enable the deviation coefficient to be modified widely and controlled to produce tires of excellent roadability for use on high-speed and high-powered vehicles.

Inasmuch as the tires are susceptible to wide variation in the structures and arrangements of the components thereof, the forms of the invention described above should be considered as illustrative and not as limiting the scope of the following claims.

I claim:

1. A plurality of tires having substantially identical dimensions and different structural characteristics, including front tires for mounting at the front of a vehicle with either sidewall facing outward and rear tires for mounting at the rear of a vehicle with either sidewall facing outward, each tire comprising a tread portion, sidewalls on opposite sides of said tread portion, beads at the edges of said sidewalls, a carcass of radially extending cords in said sidewalls, and a crown reinforcement of plies in said tread portion, each ply having parallel cords in said tread portion, said rear tires having greater resistance to tread distortion and a deviation coefficient at least 20% higher than said front tires under equal loads and pressures, so that, when said rear tires are subjected to a heavier load than said front tires and said front and rear tires are inflated so as to produce equal deflections, said rear tires exhibit a higher ratio of deviation coefficient to load carried than do said front tires, said different deviation coefficients resulting from differences as between said front and rear tires in at least one of the following:
   (a) the angles of said cords of said crown plies relative to the median plane of the tire;
   (b) the moduli of elasticity of calenderings for said cords of said crown plies;
   (c) the moduli of elasticity of said cords of said crown plies;
   (d) the moduli of elasticity of the materials of said tread portion;
   (e) the width of said crown plies;
   (f) the number of said crown plies;
   (g) the magnitude of angles of grooves formed in said tread portion relative to the median plane of the tire; and
   (h) the total area of said grooves; said deviation coefficient increasing with decreasing angles specified in (a) above, with increasing moduli specified in (b), (c), and (d) above, with increasing width specified in (e) above, and with increasing number specified in (f) above, and decreasing with grooves as specified in (g) above that extend longitudinally to enhance transverse flexibility, and with increasing area of said grooves specified in (h) above.

2. In combination, a pair of tires each comprising a tread portion, sidewalls on opposite sides of said tread portion, beads at the edges of said sidewalls, a carcass of radially extending cords in said sidewalls, and a crown reinforcement of plies in said tread portion, each ply having parallel cords in said tread portion, each of said tires being of asymmetric structure about a median plane and having a difference in resistance to tread distortion on opposite sides of said median plane giving rise to a difference in deviation coefficients of said tire, measured at substantially equal loads and pressures, of at least 20% depending on the direction of lateral force acting thereon, one of said tires being mounted at the front of a vehicle with the sidewall adjacent to the portion of the tread less resistant to distortion facing outward and the other of said tires being mounted at the rear of said vehicle with the sidewall adjacent to the portion of the tread more resistant to distortion facing outward.

3. A tire according to claim 2 wherein said difference in deviation coefficient results from differences on opposite sides of said median plane in at least one of the following:
   (a) the angles of said cords of said crown plies relative to the median plane of the tire;
   (b) the moduli of elasticity of calenderings for said cords of said crown plies;
   (c) the moduli of elasticity of said cords of said crown plies;
   (d) the moduli of elasticity of the materials of said tread portion;
   (e) the width of said crown plies;
   (f) the number of said crown plies;
   (g) the directions of grooves formed in said tread portion; and
   (h) the area of said grooves.

References Cited

UNITED STATES PATENTS

| | | | |
|---|---|---|---|
| 3,162,229 | 12/1964 | Ellenrieder et al. | 152—209 |
| 3,231,000 | 1/1966 | Massoubre | 152—361 |

FOREIGN PATENTS

| | | |
|---|---|---|
| 484,176 | 1935 | Great Britain. |

ARTHUR L. LA POINT, Primary Examiner

C. B. LYON, Assistant Examiner